(12) United States Patent
De Haan

(10) Patent No.: US 7,376,335 B2
(45) Date of Patent: May 20, 2008

(54) METHOD AND DEVICE FOR RECORDING REAL-TIME INFORMATION

(75) Inventor: Wiebe De Haan, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 630 days.

(21) Appl. No.: 10/507,773

(22) PCT Filed: Feb. 25, 2003

(86) PCT No.: PCT/IB03/00731

§ 371 (c)(1),
(2), (4) Date: Sep. 15, 2004

(87) PCT Pub. No.: WO03/079358

PCT Pub. Date: Sep. 25, 2003

(65) Prior Publication Data

US 2005/0141863 A1 Jun. 30, 2005

(30) Foreign Application Priority Data

Mar. 20, 2002 (EP) .................................. 02076090

(51) Int. Cl.
*H04N 5/781* (2006.01)
(52) U.S. Cl. .................... 386/69; 386/125; 386/95; 386/109
(58) Field of Classification Search ............. 386/125, 386/109, 69, 95
See application file for complete search history.

(56) References Cited

U.S. PATENT DOCUMENTS

| 5,745,641 | A  | * | 4/1998 | De Haan et al. ............... 386/95 |
| 6,320,825 | B1 | * | 11/2001 | Bruekers et al. .......... 369/30.17 |
| 6,512,883 | B2 | * | 1/2003 | Shim et al. ................... 386/95 |
| 7,200,073 | B2 | * | 4/2007 | Auwens et al. .......... 369/30.04 |

FOREIGN PATENT DOCUMENTS

WO    WO 0030113    5/2000

* cited by examiner

*Primary Examiner*—Thai Q. Tran
*Assistant Examiner*—Helen Shibru
(74) *Attorney, Agent, or Firm*—Michael E. Belk

(57) ABSTRACT

A device for rendering real time information arranged in cells constituted by units encoded at a variable bit rate, e.g. video on a DVD, is described. The device has various trick play modes for rendering the information at a different speeds based on speed pointers. A limited amount of speed pointers is included in the information stream. The device has a calculation unit 32 for calculating further speed pointers based on estimating the playback time of the units by retrieving cell playback information (C-PBIT) that includes the addresses of the first unit and the last unit within the cell and a cell playback time, retrieving a unit address map (VTS-VOBU-ADMAP) that includes the addresses of the units, determining a number of units within the cell by determining a position of said first and last unit in the unit address map, and dividing the cell playback time by the number of units.

8 Claims, 17 Drawing Sheets

VIDEO TITLE SET (VTS)

Figure 1A:
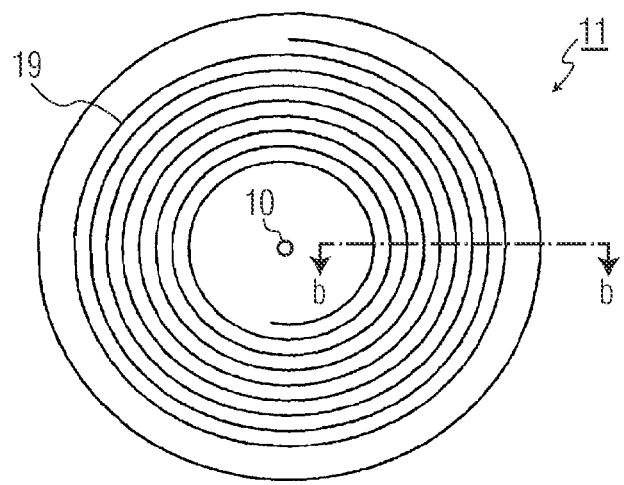

| | |
|---|---|
| VIDEO TITLE SET INFORMATION (VTSI) | (Mandatory) |
| VIDEO OBJECT SET FOR VIDEO TITLE SET MENU (VTSM_VOBS) | (Optional) |
| VIDEO OBJECT SET FOR VIDEO TITLE SET MENU (VTSTT_VOBS) | (Mandatory) |
| BACKUP FOR VIDEO TITLE SET INFORMATION (VTSI_BUP) | (Mandatory) |

| | |
|---|---|
| VIDEO TITLE SET INFORMATION MANAGEMENT TABLE (VTSI_MAT) | (Mandatory) |
| VIDEO TITLE SET PART OF TITLE SEARCH POINTER TABLE (VTS_PTT_SRPT) | (Mandatory) |
| VIDEO TITLE SET PROGRAM CHAIN INFORMATION TABLE (VTS_PGCIT) | (Mandatory) |
| VIDEO TITLE SET MENU PACI UNIT TABLE (VTSM_PGCI_UT) | (Mandatory) |
| VIDEO TITLE SET TIME MAP TABLE (VTS_TMAPT) | (Optional) |
| VIDEO TITLE SET MENU CELL ADDRESS TABLE (VTSM_C_ADT) | (Mandatory) |
| VIDEO TITLE SET MENU VIDEO OBJECT ADDRESS MAP (VTSM_VOBU_ADMAP) | (Mandatory when VTSM_VOBS exists) |
| VIDEO TITLE SET CELL ADDRESS TABLE (VTS_C_ADT) | (Mandatory when VTSM_VOBS exists) |
| VIDEO TITLE SET VIDEO OBJECT UNIT ADDRESS MAP (VTS_VOBU_ADMAP) | (Mandatory) |

FIG. 8

PROGRAM CHAIN INFORMATION (PGCI)

| |
|---|
| PROGRAM CHAIN GENERAL INFORMATION (PGC_GI) |
| PROGRAM CHAIN COMMAND TABLE (PGC_CMDT) |
| PROGRAM CHAIN PROGRAM MAP (PGC_PGMP) |
| CELL PLAYBACK INFORMATION TABLE (C_PBIT) |
| CELL POSITION INFORMATION TABLE (C_POSIT) |

FIG. 10

| | |
|---|---|
| DSI_GI (DSI GENERAL INFORMATION) | |
| NV_PCK_SCR | SCR_BASE OF NV_PCK |
| NV_PCK_LBN | LBN OF NV_PCK |
| VOBU_EA | END ADDRESS OF VOBU |
| VOBU_1STREF_EA | END ADDRESS OF THE FIRST REFERENCE PICTURE IN VOBU |
| VOBU_2NDREF_EA | END ADDRESS OF THE SECOND REFERENCE PICTURE IN VOBU |
| VOBU_3RDREF_EA | END ADDRESS OF THE THIRD REFERENCE PICTURE IN VOBU |
| VOBU_VOB_IDN | VOB ID NUMBER OF THE VOBU |
| | RESERVED |
| VOBU_C_IDN | CELL ID NUMBER OF THE VOBU |
| C_ELTM | CELL ELAPSE TIME |

FIG. 15

SML_PBI (SEAMLESS PLAYBACK INFORMATION)

| | |
|---|---|
| VOBU_SML_CAT | CATEGORY OF SEAMLESS VOBU |
| ILVU_EA | END ADDRESS OF INTERLEAVED UNIT |
| NXT_ILVU_SA | START ADDRESS OF THE NEXT INTERLEAVED UNIT |
| NXT_ILVU_SZ | SIZE OF THE NEXT INTERLEAVED UNIT |
| VOB_V_S_PTM | VIDEO START PTM IN VOB |
| VOB_V_E_PTM | VIDEO END PTM IN VOB |
| VOB_A_STP_PTM | AUDIO STOP TIME IN VOB |
| VOB_A_GAP_LEN | AUDIO GAP LENGTH IN VOB |

FIG. 16

| SML_AGLI (SEAMLESS ANGLE INFORMATION) | |
|---|---|
| SML_AGL_C1_DSTA | ADDRESS AND SIZE OF DESTINATION ILVU IN AGL_C1 |
| SML_AGL_C2_DSTA | ADDRESS AND SIZE OF DESTINATION ILVU IN AGL_C2 |
| SML_AGL_C3_DSTA | ADDRESS AND SIZE OF DESTINATION ILVU IN AGL_C3 |
| SML_AGL_C4_DSTA | ADDRESS AND SIZE OF DESTINATION ILVU IN AGL_C4 |
| SML_AGL_C5_DSTA | ADDRESS AND SIZE OF DESTINATION ILVU IN AGL_C5 |
| SML_AGL_C6_DSTA | ADDRESS AND SIZE OF DESTINATION ILVU IN AGL_C6 |
| SML_AGL_C7_DSTA | ADDRESS AND SIZE OF DESTINATION ILVU IN AGL_C7 |
| SML_AGL_C8_DSTA | ADDRESS AND SIZE OF DESTINATION ILVU IN AGL_C8 |
| SML_AGL_C9_DSTA | ADDRESS AND SIZE OF DESTINATION ILVU IN AGL_C9 |

FIG. 17

| | | CONTENTS |
|---|---|---|
| FWDI | VIDEO | NEXT VOBU START ADDRESS WITH A VIDEO DATA |
| FWDI | 240 | +240 VOBU START ADDRESS AND VIDEO EXIST FLAG |
| FWDI | 140 | +120 VOBU START ADDRESS AND VIDEO EXIST FLAG |
| FWDI | 60 | + 60 VOBU START ADDRESS AND VIDEO EXIST FLAG |
| FWDI | 20 | + 20 VOBU START ADDRESS AND VIDEO EXIST FLAG |
| FWDI | 15 | + 15 VOBU START ADDRESS AND VIDEO EXIST FLAG |
| FWDI | 14 | + 14 VOBU START ADDRESS AND VIDEO EXIST FLAG |
| FWDI | 13 | + 13 VOBU START ADDRESS AND VIDEO EXIST FLAG |
| FWDI | 12 | + 12 VOBU START ADDRESS AND VIDEO EXIST FLAG |
| FWDI | 11 | + 11 VOBU START ADDRESS AND VIDEO EXIST FLAG |
| FWDI | 10 | + 10 VOBU START ADDRESS AND VIDEO EXIST FLAG |
| FWDI | 9 | + 9 VOBU START ADDRESS AND VIDEO EXIST FLAG |
| FWDI | 8 | + 8 VOBU START ADDRESS AND VIDEO EXIST FLAG |
| FWDI | 7 | + 7 VOBU START ADDRESS AND VIDEO EXIST FLAG |
| FWDI | 6 | + 6 VOBU START ADDRESS AND VIDEO EXIST FLAG |
| FWDI | 5 | + 5 VOBU START ADDRESS AND VIDEO EXIST FLAG |
| FWDI | 4 | + 4 VOBU START ADDRESS AND VIDEO EXIST FLAG |
| FWDI | 3 | + 3 VOBU START ADDRESS AND VIDEO EXIST FLAG |
| FWDI | 2 | + 2 VOBU START ADDRESS AND VIDEO EXIST FLAG |
| FWDI | 1 | + 1 VOBU START ADDRESS AND VIDEO EXIST FLAG |
| FWDI | NEXT | NEXT VOBU START ADDRESS AND VIDEO EXIST FLAG |
| FWDI | PREV | PREVIOUS VOBU START ADDRESS AND VIDEO EXIST FLAG |
| BWDI | 1 | − 1 VOBU START ADDRESS AND VIDEO EXIST FLAG |
| BWDI | 2 | − 2 VOBU START ADDRESS AND VIDEO EXIST FLAG |
| BWDI | 3 | − 3 VOBU START ADDRESS AND VIDEO EXIST FLAG |
| BWDI | 4 | − 4 VOBU START ADDRESS AND VIDEO EXIST FLAG |
| BWDI | 5 | − 5 VOBU START ADDRESS AND VIDEO EXIST FLAG |
| BWDI | 6 | − 6 VOBU START ADDRESS AND VIDEO EXIST FLAG |
| BWDI | 7 | − 7 VOBU START ADDRESS AND VIDEO EXIST FLAG |
| BWDI | 8 | − 8 VOBU START ADDRESS AND VIDEO EXIST FLAG |
| BWDI | 9 | − 9 VOBU START ADDRESS AND VIDEO EXIST FLAG |
| BWDI | 10 | − 10 VOBU START ADDRESS AND VIDEO EXIST FLAG |
| BWDI | 11 | − 11 VOBU START ADDRESS AND VIDEO EXIST FLAG |
| BWDI | 12 | − 12 VOBU START ADDRESS AND VIDEO EXIST FLAG |
| BWDI | 13 | − 13 VOBU START ADDRESS AND VIDEO EXIST FLAG |
| BWDI | 14 | − 14 VOBU START ADDRESS AND VIDEO EXIST FLAG |
| BWDI | 15 | − 15 VOBU START ADDRESS AND VIDEO EXIST FLAG |
| BWDI | 20 | − 20 VOBU START ADDRESS AND VIDEO EXIST FLAG |
| BWDI | 60 | − 60 VOBU START ADDRESS AND VIDEO EXIST FLAG |
| BWDI | 120 | −120 VOBU START ADDRESS AND VIDEO EXIST FLAG |
| BWDI | 240 | −240 VOBU START ADDRESS AND VIDEO EXIST FLAG |
| BWDI | VIDEO | PREVIOUS VOBU START ADDRESS WITH A VIDEO DATA |

FIG. 18

METHOD AND DEVICE FOR RECORDING REAL-TIME INFORMATION

The invention relates to a device for rendering real time information from a record carrier, which device comprises read means for retrieving the real time information and playback parameters related thereto from a track on the record carrier, and speed means for rendering the real time information at a speed different from the real time speed based on speed pointers, which real time information is subdivided into units, a number of consecutive units constituting a cell and local playback parameters being included in the units, which local playback parameters comprise speed pointers to units located at a forward and/or backward distance relative to the unit in which the pointers are included.

The invention further relates to a method of rendering real time information, which method comprises controlling the speed of rendering the real time information to a speed different from the real time speed based on speed pointers, which real time information comprises playback parameters related thereto and is subdivided into units, a number of consecutive units constituting a cell and local playback parameters being included in the units, which local playback parameters comprise speed pointers to units located at a forward and/or backward distance relative to the unit in which the pointers are included.

The invention further relates to a computer program product for rendering real time information.

A device for retrieving real-time information from a record carrier is known from WO 00/30113. Real-time information is information having a real-time nature to be reproduced at a prescribed rate, usually audio or video information, or a combination of audio and video. In the known method video information is encoded digitally and subdivided into units, which are short, but independently reproducible segments of the real-time information, while corresponding audio information may be included in the units. Control information for accessing and reproducing the real-time material is generated for enabling several playback functions. A user playable program usually called a title, for example a movie, is constituted by a sequence of cells, where a cell comprises a sequence of units and corresponding control information. Part of the control information, so called playback parameters, are included in the units to enable playback control by using information stored with the related real-time information itself, which reduces the need for memory in the player for storing control information read from separate tables, such as address lists of units. In particular, the playback parameters comprise speed pointers pointing to units located at a distance in forward or backward direction, usually at fixed intervals in playback time. As the units are stored on the record carrier consecutively, said distance corresponds to a distance along the track between the unit comprising said pointers and such forward and backward units. In the event of a variable bitrate real-time signal, e.g. video after compression by MPEG2, no fixed relation exists between the distance in time and the distance along the track. Also other data, e.g. in the event of multiplexed audio, video and text, may cause a non predictable distance along the track. So said local pointers are used in jumps to other units relative to the unit just read. The user may play the movie at standard speed reading the units consecutively, but he may also scan the material in different speed modes or trick play modes, e.g. fast forward or reverse slow motion, using the playback parameters in the units pointing in forward and/or backward direction. The way the control information and the real-time information are provided on a record carrier is standardized to enable players of different brands to reproduce the material. An example of such a standard is the DVD-video standard. Further details about the DVD disc can be found in reference: ECMA-267: 120 mm DVD—Read-Only Disc—(1997). During real-time recording in a consumer recording device only a limited number of said local speed pointers can be calculated and are included in the units, e.g. pointers for at most 3 seconds in forward direction. Further at the boundary of a cell only a limited number of pointers is available. The rendering of the video information at a higher speed requires speed pointers to units at larger distances which are not available. Hence the range of speeds for smoothly rendering the video information is limited.

It is an object of the invention to provide a device and method for smoothly rendering information at a speed different from the real time speed for a large range of speeds.

For this purpose, the device as described in the opening paragraph is characterized in that the speed means comprise calculation means for calculating at least one further speed pointer based on estimating the playback time of the units by retrieving cell playback information that includes the addresses of the first unit and the last unit within the cell and a cell playback time, retrieving a unit address map that includes the addresses of a consecutive sequence of units, determining a number of units within the cell by determining a position of the addresses of said first and last unit in the unit address map, and dividing the cell playback time by the number of units. The method as described in the opening paragraph is characterized in that the method comprises calculating at least one further speed pointer based on estimating the playback time of the units by retrieving cell playback information that includes the addresses of the first unit and the last unit within the cell and a cell playback time, retrieving a unit address map that includes the addresses of a consecutive sequence of units, determining a number of units within the cell by determining a position of the addresses of said first and last unit in the unit address map, and dividing the cell playback time by the number of units. This has the effect that speed pointers for a required range of distances can be calculated by retrieving the cell playback information and unit address map for a required amount of real time data which is to be reproduced at a different speed. Hence a smooth rendering is achieved across a large range of reproduction speeds.

The invention is also based on the following recognition. The real time information is compressed at a variable bit rate, and hence the units comprise a variable amount of real time information. Nevertheless the inventor has seen that the estimated unit playback time can be sufficiently close to the actual playback time for the following reasons. The range of playback time allowed for a unit is usually limited by the recording standard, e.g. to between 0.4 and 1.0 seconds for DVD. Further home recorders tend to use fixed sizes for encoding an amount of video frames, e.g. for the GOP (Group of Pictures) in MPEG2, and such amounts of frames are aligned with the units. Further users are not very sensitive to varying speed differences at higher reproduction speeds, because there is a decreased correlation between pictures displayed in such a sequence. Also the inventor has seen that although an error in time and speed may occur within a cell, such error will be reduced around the cell boundary because the boundary acts as a calibration point in the estimated speed pointer values.

In an embodiment of the device the speed means are arranged for using the speed pointers included in the local playback parameters for jumping to distances in time up to a predefined value and for using the further speed pointer for jumping a larger distance in time. In another embodiment of the device the speed means comprise means for detecting for which maximum local jump distance a local speed pointer is available and using the local speed pointers for jumping distances up to the maximum local jump distance. This has the advantage that for the lower speed reproduction the speed corresponds to the required speed because the speed pointers in the local playback parameters are calculated during recording, whereas larger speeds are closely approximated based on the estimated values of the speed pointers.

In an embodiment of the device the speed means comprise means for detecting a speed error by comparing a current cell time from the unit being retrieved after a jump and a target time based on a required speed, and for compensating the speed error. This has the advantage, that the average error in the speed of reproduction will be effectively reduced by introducing an appropriate opposite increase or reduction in the target speed.

Further preferred embodiments of the method and device according to the invention are given in the dependent claims.

Figure 1B:
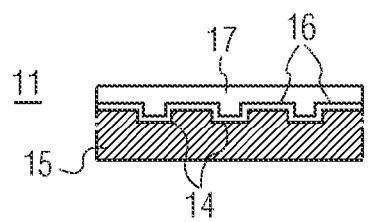
Figure 2:
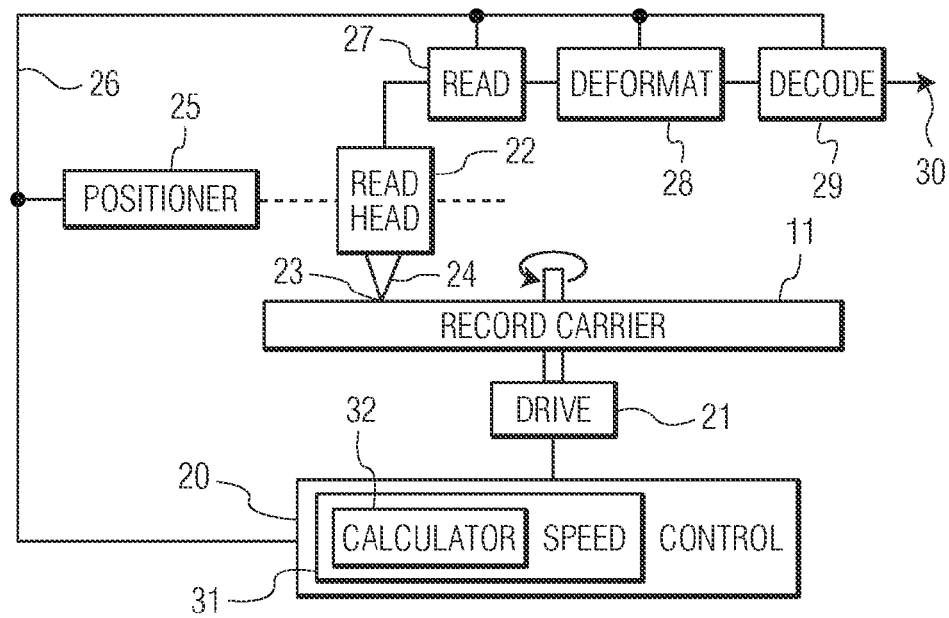
Figure 3:
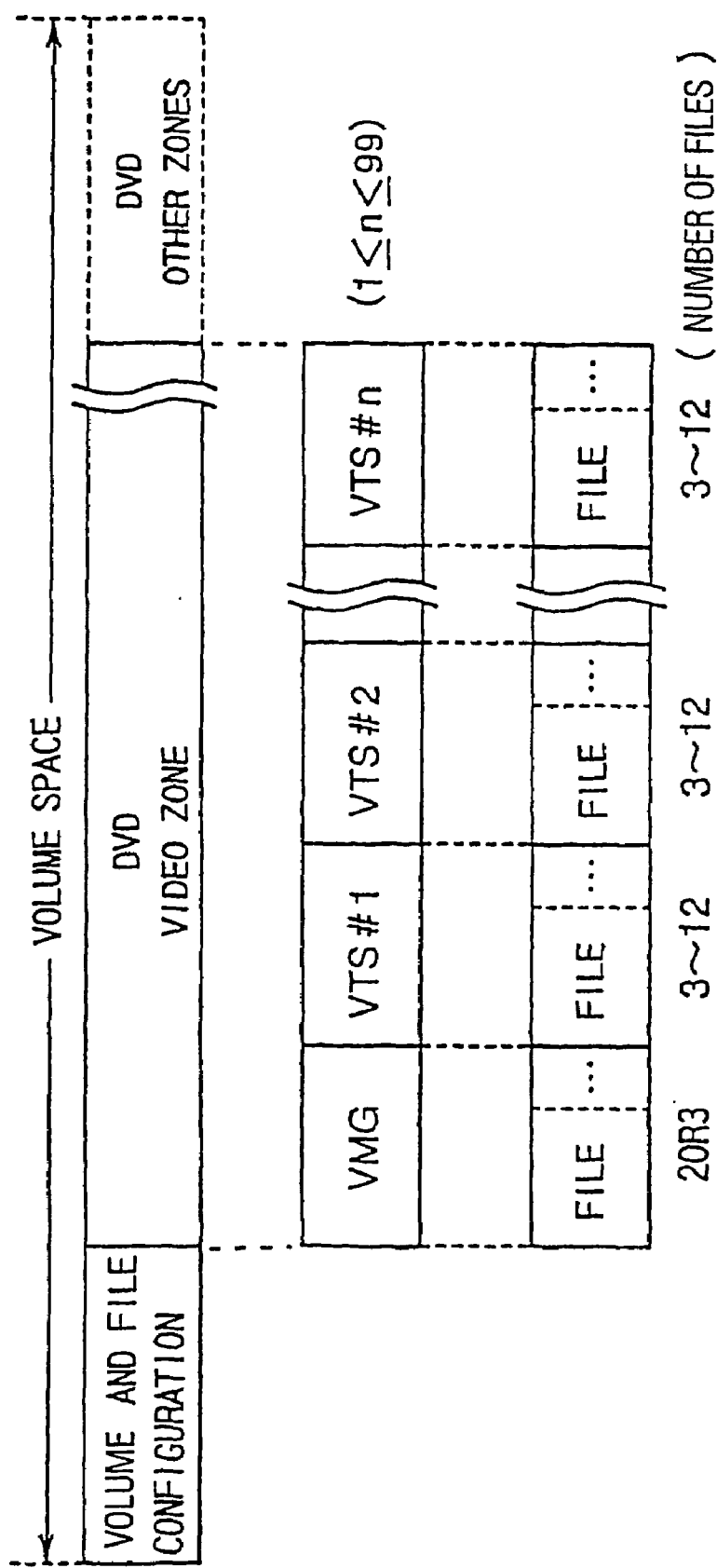
Figure 4:
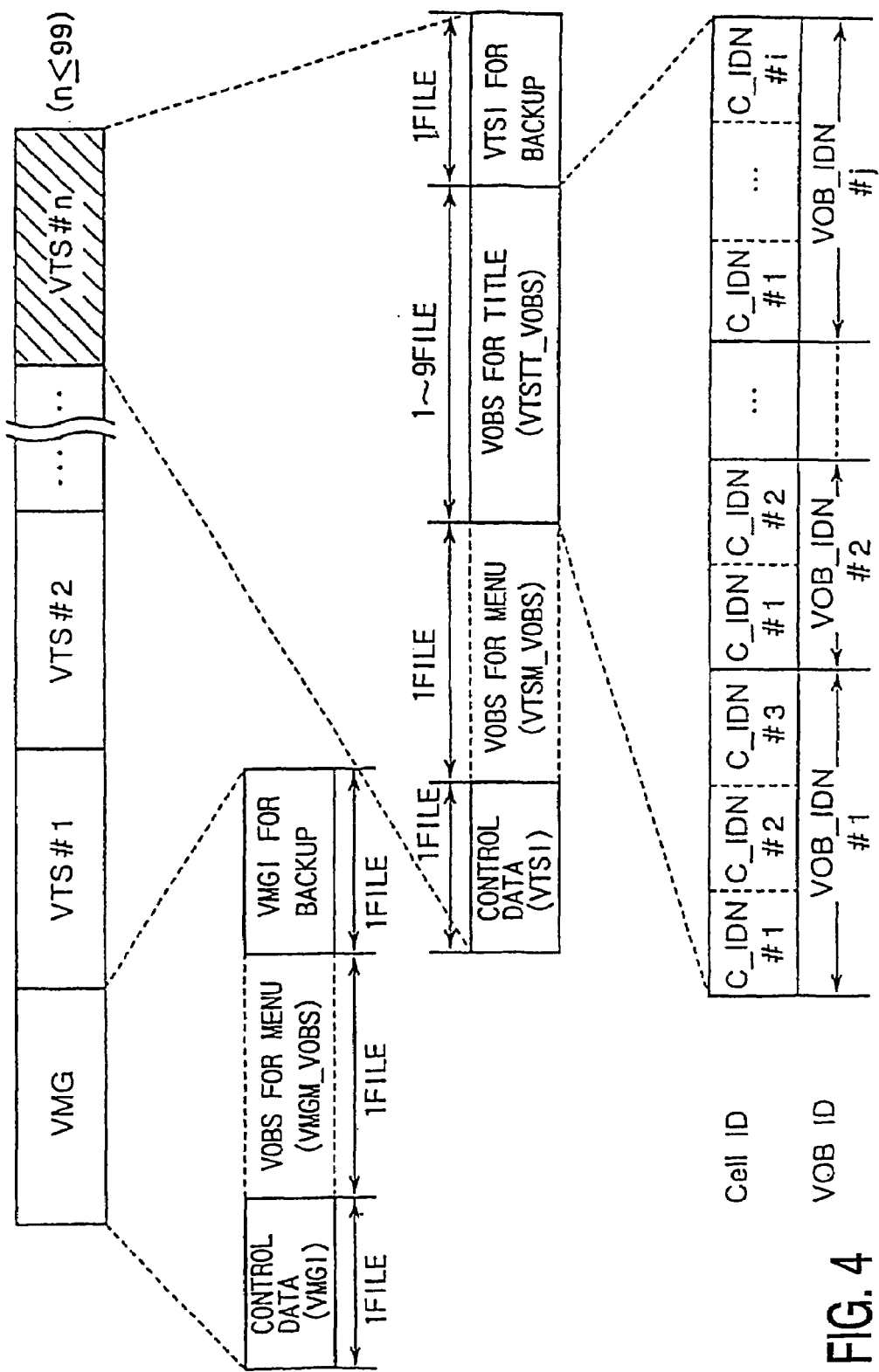
Figure 5:
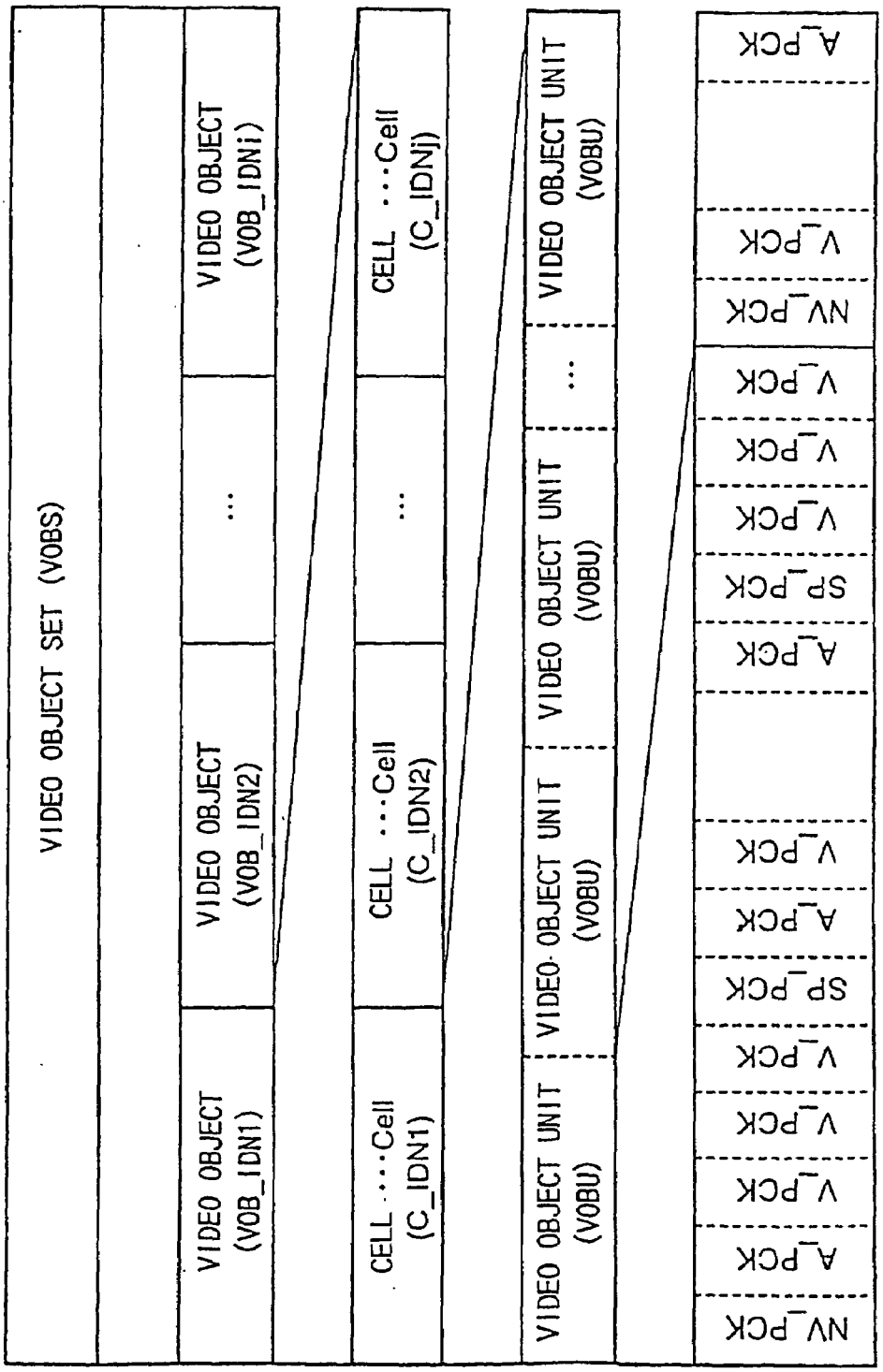
Figure 6:
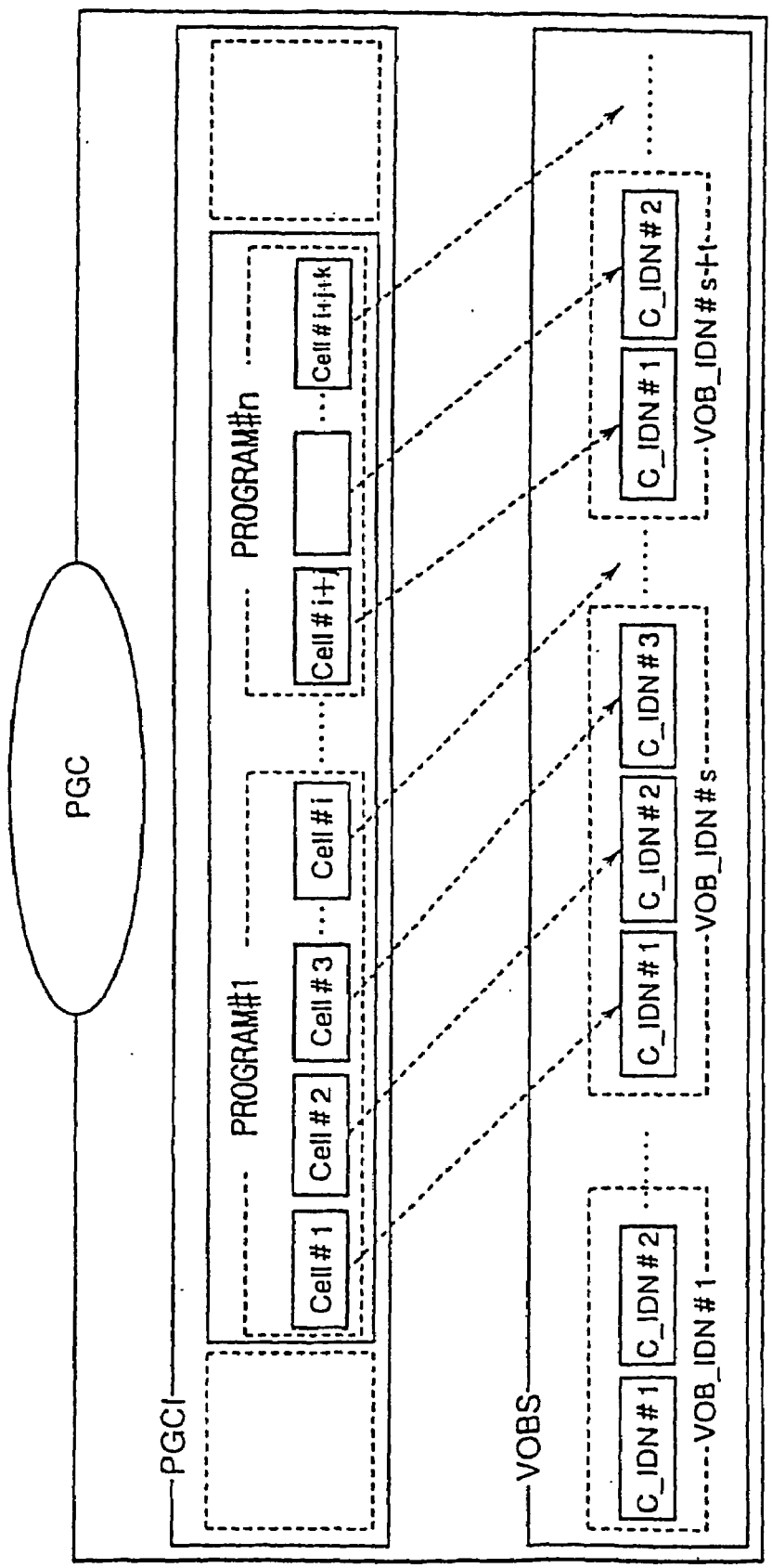
Figure 7:
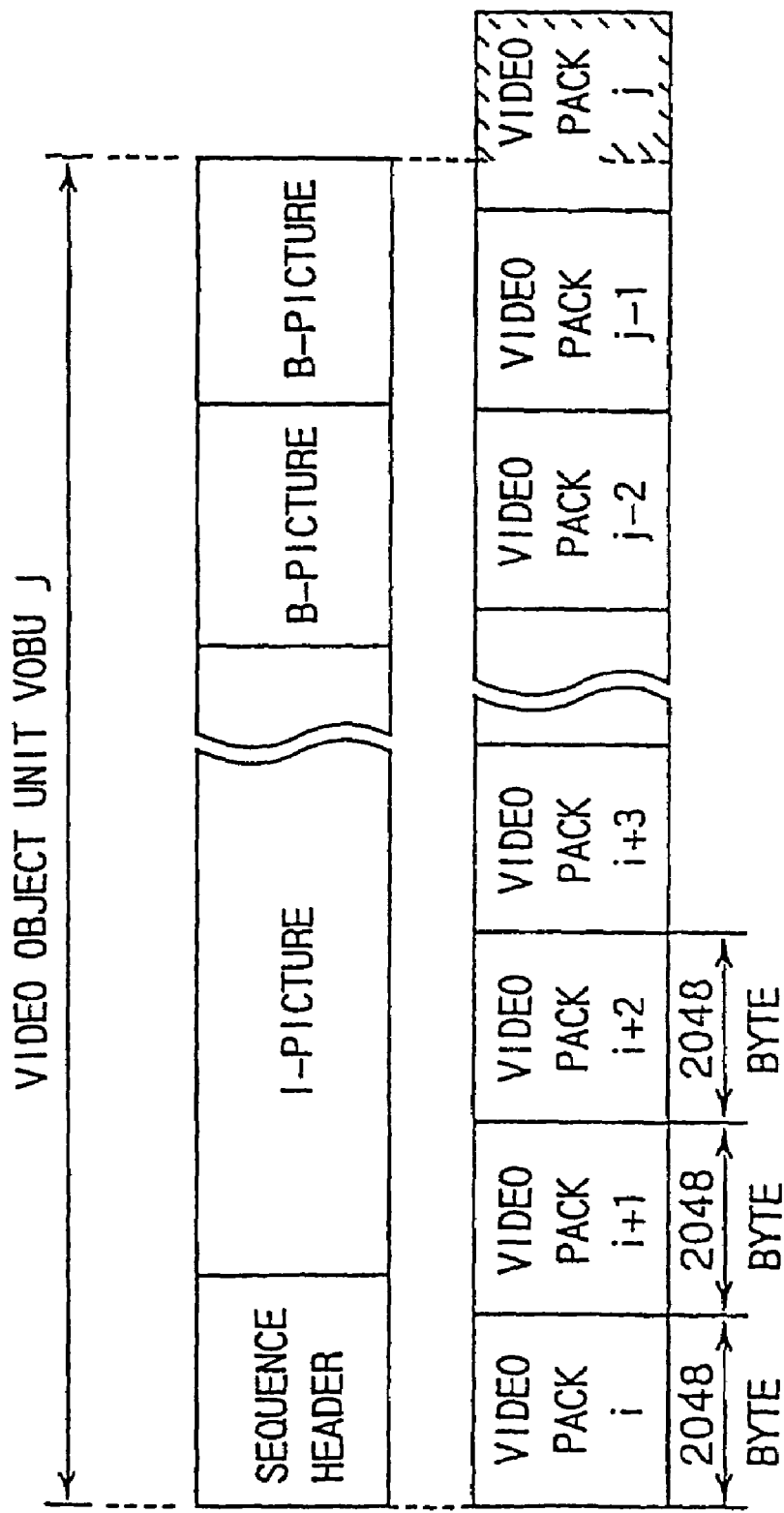
Figure 9:
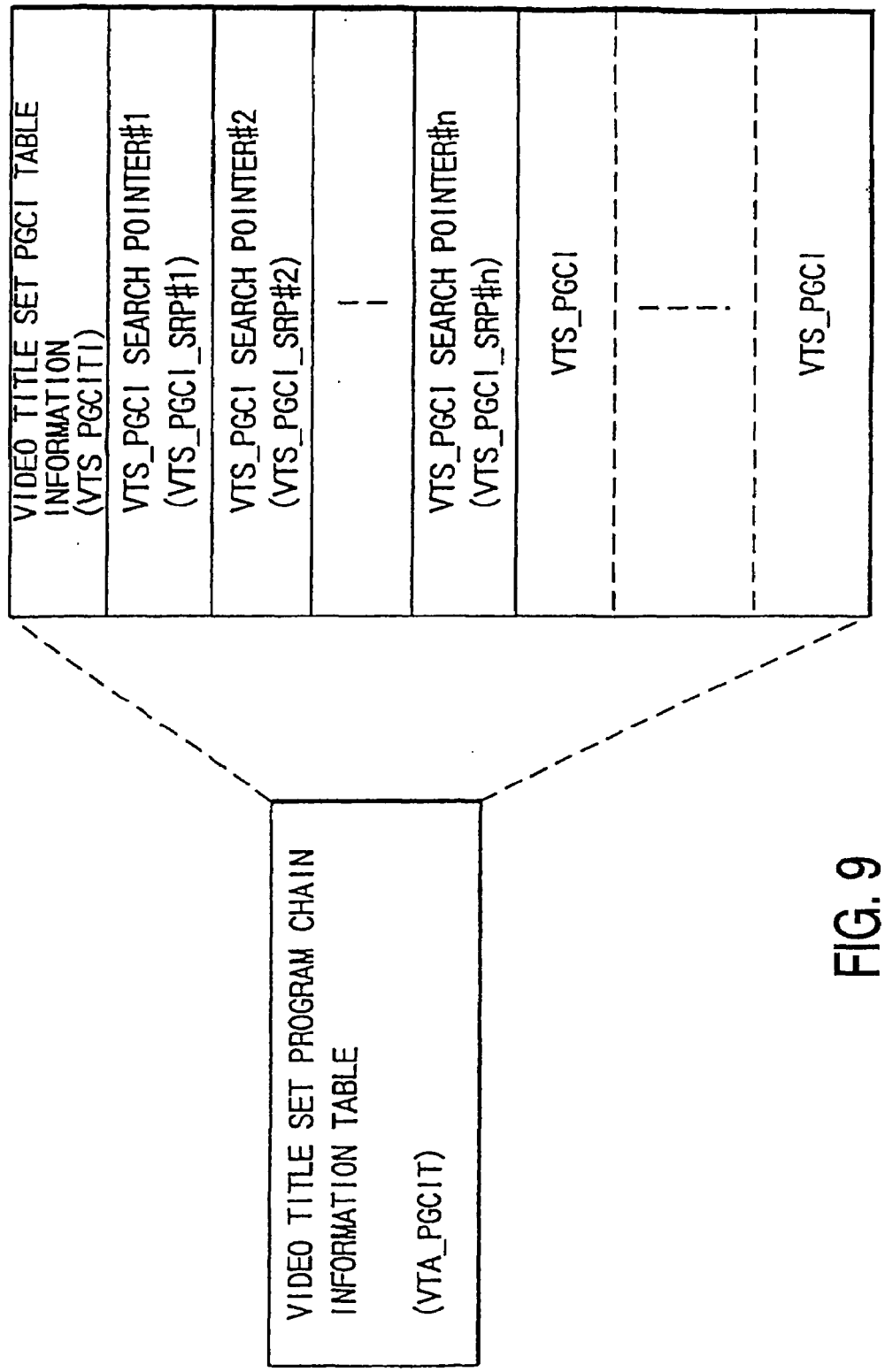
Figure 11:
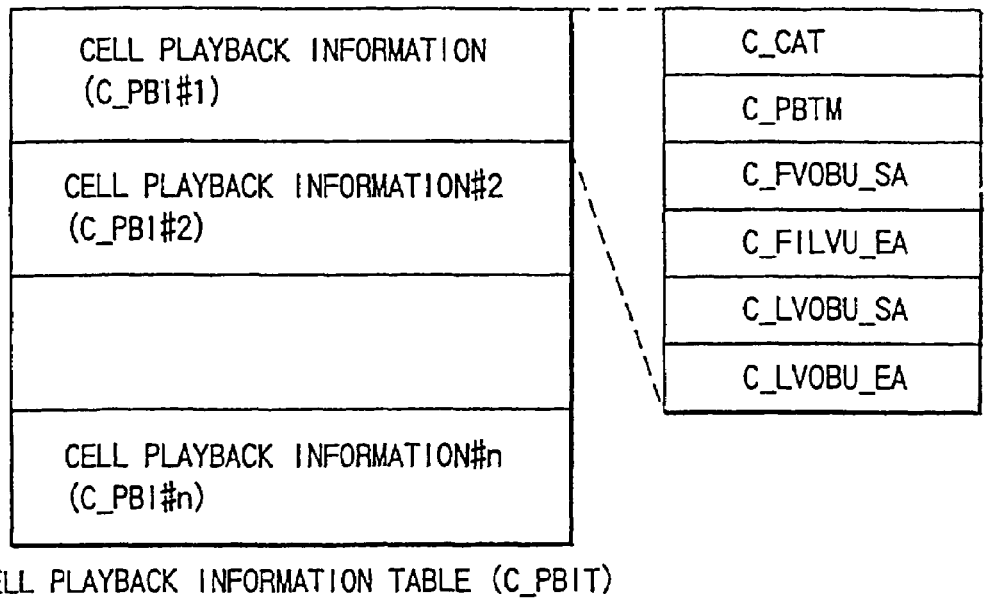
Figure 12:
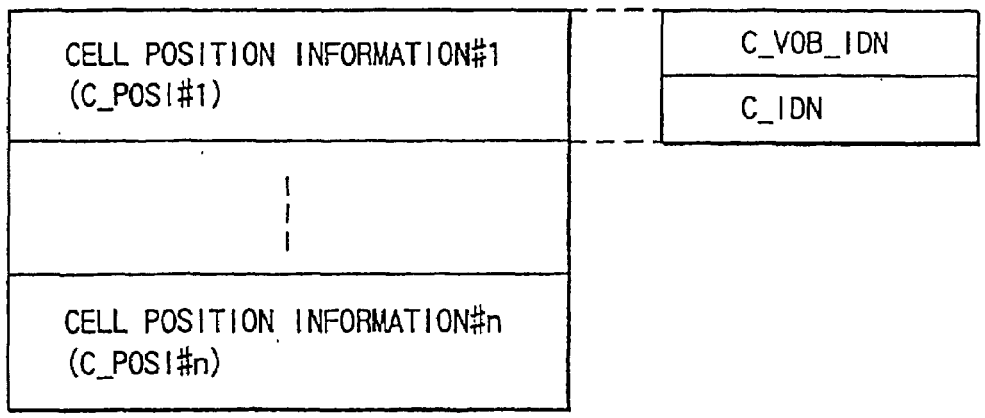
Figure 13:
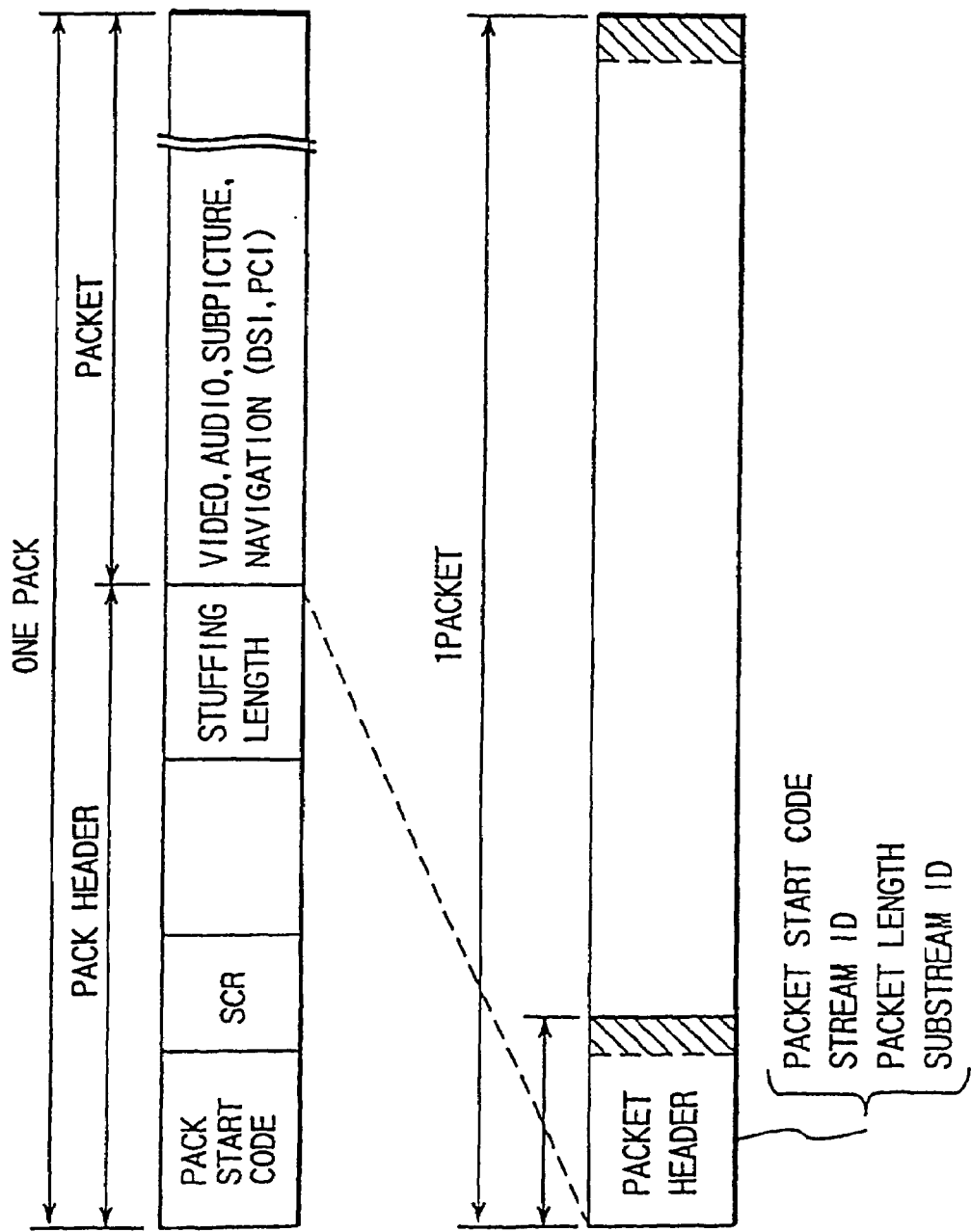
Figure 14:
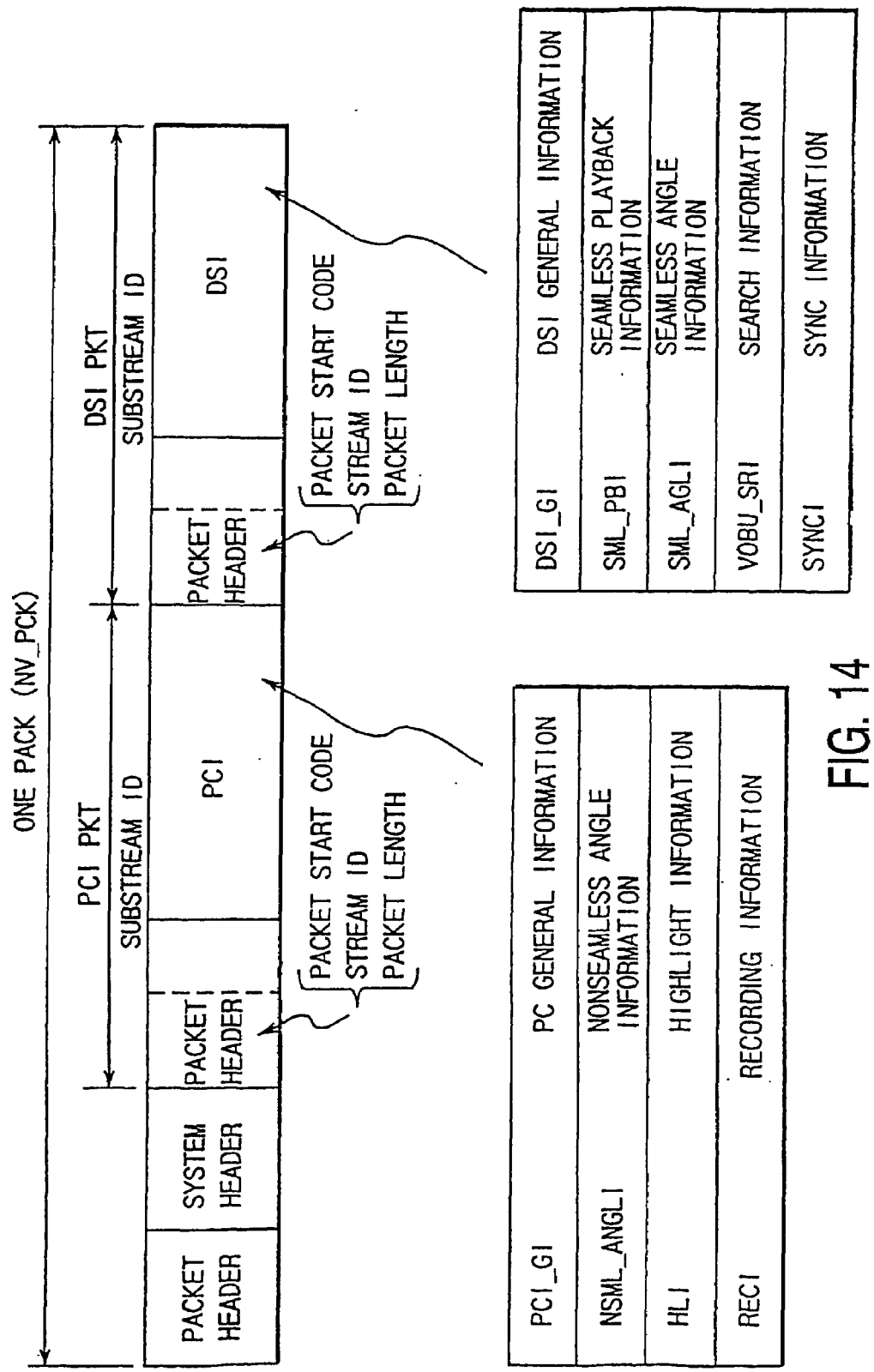
Figure 19:
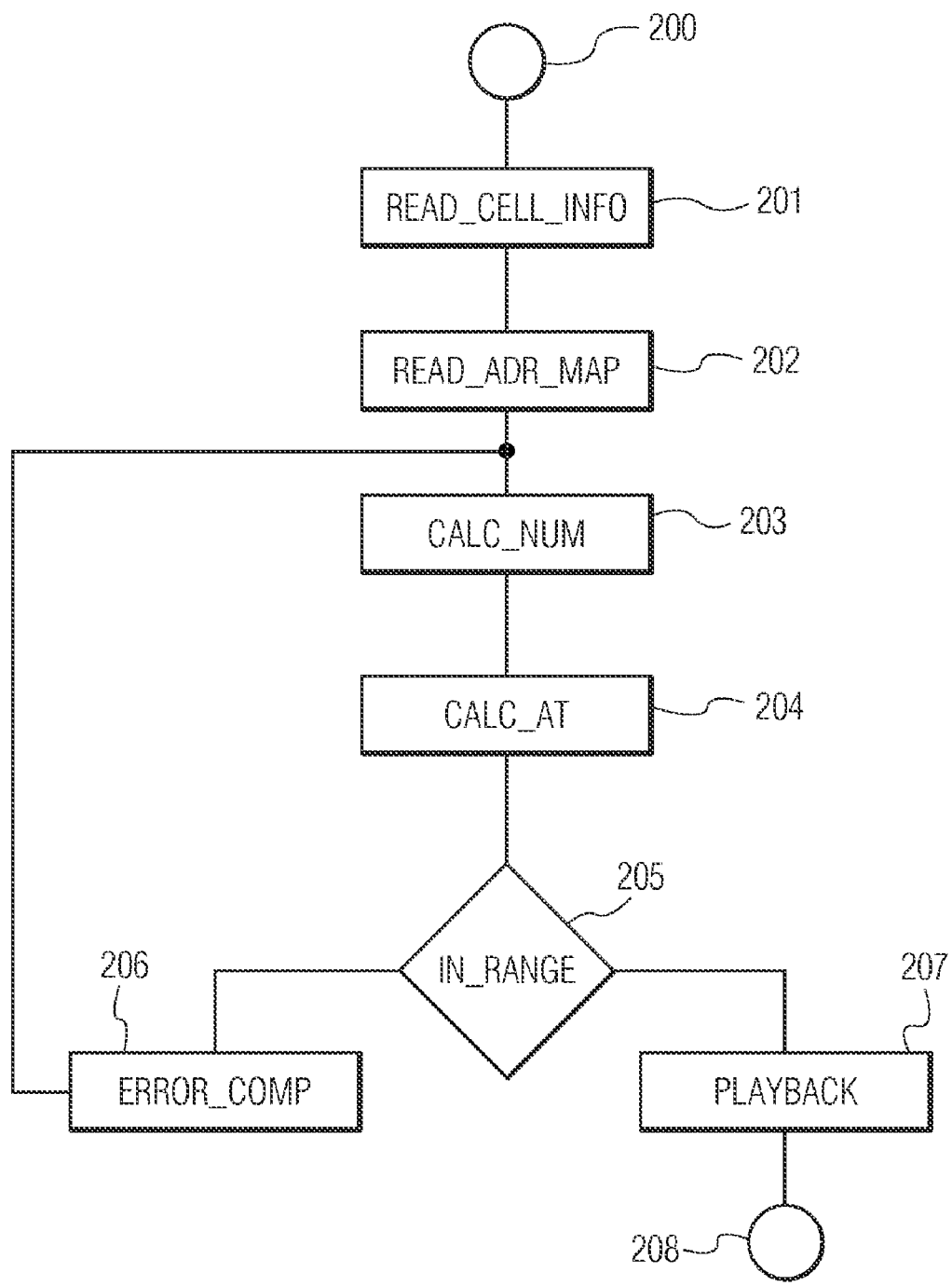

These and other aspects of the invention will be apparent from and elucidated further with reference to the embodiments described by way of example in the following description and with reference to the accompanying drawings, in which FIG. 1 shows a record carrier, FIG. 2 shows a rendering device, FIG. 3 shows volume space on an optical disk, FIG. 4 shows the structures of the video manager and the video title sets in more detail, FIG. 5 shows a relationship between video object set and cells and the contents of the cells hierarchically, FIG. 6 shows a diagram of controlling the sequence of playback of the cells by a program chain, FIG. 7 shows a relationship between a video object unit and video packs in the unit, FIG. 8 shows video title set information in a video title set, FIG. 9 shows the contents of a video title set program chain information table, FIG. 10 shows the structure, of program chain information, FIG. 11 shows cell playback information and the contents thereof, FIG. 12 shows the contents of a cell position information table, FIG. 13 shows the formats of a pack and a packet recorded on an optical disk, FIG. 14 shows an NV_PCK pack, FIG. 15 shows information described in the data search general information, FIG. 16 shows information described in the seamless playback information, FIG. 17 shows the contents of the seamless angle information, FIG. 18 shows the VOBU search information, and FIG. 19 shows the calculation of average time per unit.

Corresponding elements in different Figures have identical reference numerals.

FIG. 1a shows a disc-shaped record carrier 11 having a track 19 and a central hole 10. The track 19 is arranged in accordance with a spiral pattern of turns constituting substantially parallel tracks on an information layer. The record carrier may be optically readable, called an optical disc, and has an information layer of a read-only type, e.g. like DVD-video, or a recordable type. Examples of a recordable disc are the CD-R and CD-RW, and writable versions of DVD, such as DVD-RAM and DVD+RW. The track 19 on the recordable type of record carrier is indicated by a pre-embossed track structure provided during manufacture of the blank record carrier. The track structure is constituted, for example, by a pregroove 14 which enables a read/write head to follow the track during scanning. The information is represented on the information layer by optically detectable marks provided along the track, e.g. pits and lands, or areas with a reflection coefficient different from their surroundings, obtained when recording in materials such as dye, alloy or phase change material, or in the form of areas with a direction of magnetization different from their surroundings, obtained when recording in magneto-optical material.

FIG. 1b is a cross-section taken along the line b-b of the record carrier 11 of the recordable type, in which a transparent substrate 15 is provided with a recording layer 16 and a protective layer 17. The pregroove 14 may be implemented as an indentation or an elevation, or as a material property deviating from its surroundings.

The record carrier 11 is intended for carrying real-time information according to a standardized format, to be playable on standardized playback devices. The recording format includes the way information is recorded, encoded and logically mapped. The logical mapping may comprise a subdivision of the available area in a lead-in, a recording area for user data and a lead-out. Further the mapping may comprise file management information for retrieving the user information, such as a Table Of Contents or a file system, e.g. ISO 9660 for CD-ROM or UDF for DVD-ROM. Such file management information is mapped on a predefined location on the record carrier, usually in or directly after the lead-in area. However this document further relates to the way the real-time information is structured and retrieved by defining the format of the video and/or audio information and its corresponding control information. In particular the real time information is reproduced at a speed different from the real time speed by using speed pointers. The process of calculating additional speed pointers is described below with reference to FIG. 19.

FIG. 2 shows a rendering device for reading real time information from a record carrier 11 as shown in FIG. 1. The device is provided with a drive unit 21 for rotating the record carrier 11, and with read means including a read head 22 for scanning the track 19 on the record carrier, a read unit 27, a deformatter 28 and a decoder 29. Writing and reading of information for recording on optical disks and usable formatting, error correcting and channel coding rules are well-known in the art, e.g. from the CD or DVD system. The apparatus is provided with a positioning unit 25 for coarsely positioning the read head 22 on the track in the radial direction (perpendicular to the length direction of the track). The read head 22 comprises an optical system of a known type for generating a radiation beam 24 guided through optical elements and focused to a radiation spot 23 on a track of the information layer of the record carrier. The radiation beam 24 is generated by a radiation source, e.g. a laser diode. The read head further comprises a focusing actuator for moving the focus of the radiation beam 24 along the optical axis of said beam and a tracking actuator for fine positioning of the spot 23 in a radial direction on the center of the track. The tracking actuator may comprise for example coils for radially moving an optical element or a piezo element for changing the angle of a reflecting element with respect to the optical axis of the beam 24. The radiation reflected by the information layer is detected by a detector of a usual type, e.g. a four-quadrant diode, in the read head 22 for generating a read signal and further detector signals including a tracking error and a focusing error signal, which signals are processed and applied to said tracking and focusing actuators. The read unit 27 is of a usual type for example comprising a channel decoder and an error correction unit for retrieving the information from the read signal. The information is coupled to the deformatter 28 for storing the information and retrieving the control parameters and various data types included in the real time information as recorded on the record carrier according to the predefined format as described below with reference to FIGS. 3 to 18. The deformatted information from the deformatter 28 is coupled to the decoder 29, which decoder has one or more decoding units for decoding real time information, e.g. video and/or audio according to the DVD standard. The device is further provided with a control unit 20 for receiving commands from a user or from a host computer for controlling the apparatus via control lines 26, e.g. a system bus, connected to the drive unit 21, the positioning unit 25 and the read means. To this end, the control unit 20 comprises control circuitry, for example a microprocessor, a program memory and control gates, for performing the usual control procedures. The control unit 20 may also be implemented as a state machine in logic circuits. In an embodiment the device is provided with a display unit (not shown) coupled to the decoder 29 for displaying the video to a user, e.g. a portable playback device. It is to be noted, that the real time information stream as recorded comprises units of data, e.g. the VOBUs as described for DVD below, which comprise the real-time information and playback parameters.

The control unit 20 is provided with a speed control unit 31 for controlling the speed of reproduction of the real time information, e.g. a fast forward or backward playback mode. In an embodiment the speed control unit also executes time search, which is performed for example in a repeat mode wherein the player searches for the unit with the indicated time using the forward references. Suppose a cell is 120 seconds and the maximum reference to the next unit is 3 seconds, then finding the required unit costs on average 20 disc accesses and worst case 39 disc accesses in a practical device. The fact that no speed pointer to a unit at the required distance are available costs a lot of time for the user, assuming a speed of 4 disc accesses per second. In an embodiment the speed control unit is implemented as a computer program for programming a general purpose computer, which computer retrieves the real time information from a medium via a peripheral device, e.g. a DVD-ROM drive, or gets the information via a network like the internet. For executing the different speed modes of reproduction the speed control unit retrieves speed pointers from the record carrier. An example of pointers which indicate the location of units of video information in forward or backward direction is described below with reference to FIG. 18. Such local speed pointers are included in the stream of video information. The structure describes the start address of VOBUs presented 0.5*n second in the forward and backward direction. However the pointers do not go outside the cell boundary. If a VOBU does not exist then a value of 3F FF FF FF is filled in to indicate that the VOBU does not exist in this place. For example for executing a 32× fast forward speed and showing video fragments of 0.3 to 0.4 seconds, and then a jump has to be made about 10 seconds forwards, indicated by pointer FWDI_20. However, this local speed pointer may not exist in the local pointers, e.g. because a recording has been made in a home video recorder which cannot calculate forward pointers for more than its buffer size, e.g. 3 seconds of video, or because the video does not exist within the current cell. For calculating further speed pointers the speed unit 31 comprises a calculation unit 32 cooperating with the speed control unit, e.g. a specific part of the software for programming the processing unit. The additional speed pointers are calculated based on estimating the playback time of the units in the real time information in the area to be reproduced at a different speed as described with reference to FIG. 19.

In embodiment of the device the speed unit is arranged for using the speed pointers included in the local playback parameters for jumping to distances in time up to a predefined value and for using the further speed pointer for jumping a larger distance in time. The predefined value is 3 seconds in a practical device, as in most recording local speed pointers are available at least up to this value. In an embodiment the speed means are arranged for detecting for which maximum local jump distance a local speed pointer is available and using the local speed pointers for jumping distances up to the maximum local jump distance. The speed means retrieve the local speed pointers embedded in the stream and detect which pointers point to actual video units, e.g. by detecting a video exist status bit or a default value indicating that the pointer for a specific required time jump is not valid, e.g. 3F FF FF FF as described above.

In an embodiment of the device the speed unit is arranged for using the speed pointers included in the local playback parameters for jumping up to a cell boundary and for using the further speed pointer that have been calculated for jumping a distance in time across said cell boundary. The cell boundary can be derived from the cell playback information as described below.

FIG. 3 shows volume space on the optical disk 11. As shown in FIG. 3, the volume space consists of a volume and file configuration zone, a DVD-video zone, and other zones. In the volume and file configuration zone control data is recorded according to a configuration format (e.g. UDF Universal Disk Format Specification Revision 1.02), the data of which can be read by any computer that meets a predetermined standard. The DVD-video zone has a video manager (VMG) and a video title set (VTS). The video manager (VMG) and the video title set (VTS) each consist of multiple files. The video manager (VMG) is information for controlling the video title set (VTS).

In FIG. 4 shows the structures of the video manager (VMG) and the video title set (VTS) in more detail. The video manager (VMG) has video manager information (VMGI) as control data and a video object set (VMGM_VOBS) as data for menu display. Also, backup video manager information (VMGI_BUP) that is identical in content to the VMGI is included. The video title set (VTS) contains video title set information (VTSI) as control data, optionally a video object set (VTSM_VOBS) as data for menu display, and a video object set (VTSTT_VOBS) for the title of a video title set that is a video object set for video display. Also, backup video title set information (VTSI_BUP) that is identical in content to the VTSI is included. The video object set (VTSTT_VOBS) for video display is made up by multiple cells. Each cell is assigned a cell identification number.

FIG. 5 shows a relationship between the video object set (VOBS) and the cells and the contents of the cells hierarchically. When DVD playback processing is performed, video breaks (scene changes, angle changes, story changes, etc.) and special playback are handled in units of cells (Cell), or in units of video object units (VOBU) that are in a layer below the cells, or in units of interleaved units (ILVU). First, the video object set (VOBS) comprises multiple video objects (VOB_IDN1 to VOB_IDNi). Moreover, one video object comprises multiple cells (C_DN1 to C_IDNj). Furthermore, one cell (cell) comprises multiple video object units (VOBU) or interleaved units that are described later. One video object unit (VOBU) comprises one navigation pack (NV_PCK), multiple audio packs (A_PCK), multiple video packs (V_PCK), and multiple subpicture packs (SP_PCK). The navigation pack (NV_PCK) is mainly used as control data for control of reproduced display of data in the video object unit to which it belongs and control data for search for data in the video object unit. The video pack (V_PCK) is main video information, which is compressed in accordance with the MPEG2 standard or the like. The subpicture pack (SP_PCK) is sub video information having contents that are auxiliary to main video, such as subtitles. The audio pack (A_PCK) is sound information.

FIG. 6 shows a diagram of controlling the sequence of playback of the cells (Cells) by a program chain (PGC). As the program chain (PGC), various program chains (PGC#1, PGC#2, PGC#3, . . . ) are prepared so as to allow the order of playback of data cells to be set variously. Therefore, the order of playback of cells will be set by making a choice among the program chains. An example in which program #1 to program #n described by program chain information (PGCI) are executed is shown. The program shown has the contents to specify a cell specified by (VOB_IDN#s, C_IDN#1) and subsequent cells within the video object set (VOBS) in turn. The program chain, recorded on the management information recording area of the optical disk, is information that is read prior to the reading of the video title set of the optical disk and then stored in the memory in the system controller. The management information is placed at the beginning of the video manager and each video title set.

FIG. 7 shows a relationship between a video object unit (VOBU) and video packs in it. Video data in VOBU comprises one or more GOPs (GOP=Group Of Pictures). Encoded video data conforms to MPEG2 (ISO/IEC13818-2) by way of example. The GOP in VOBU comprises an I-picture and B-pictures and the continuation of this data is divided into video packs. Next, a description is given of a data unit when multi-angle information is recorded and reproduced. When multiple scenes that differ in point of view for a subject are recorded on an optical disk, an interleaved-block portion is built on recording tracks to perform seamless playback. In the interleaved block portion, multiple video objects (VOB) that differ in angle are each divided into multiple interleaved units. The interleaved units are recorded in such an arrangement as allows seems playback. Multiple stories may be multiplexed on a time division basis. In the description, all of the divided blocks were termed cells. Next, a description will be given of the interleaved units and management information used for playing back the interleaved units.

FIG. 8 shows video title set information (VTSI) in video title set (VTS). A video title set program chain information table (VTS_PGCIT) is described in the video title set information (VTSI). Thus, when a video object set (VOBS) in one video title set (VTS) is played back, a program chain is utilized which is specified by the producer or selected by the user from multiple program chains presented in the video title set program chain information table (VTS_PGCIT). In the VTSI, the following data are further described. VTSI_MAT is a video title set information management table, in which what kinds of information are present in this video title set and the starting and ending addresses of each item of information are described. VTS_PTT_SRPT is a video title set part-of-title search pointer table, in which entry points of titles and the like are described. VTSM_PGCI_UT is a video title set menu program chain information unit table, in which a menu of video title sets is described in various languages. Thus, the menu allows the user to determine what kind of video title set is described and what style of order playback can be performed in. VTS_TMAPT is a video title set time map table, in which information on the recorded position of each VOBU is described which is managed within each program chain and indicated at regular intervals of seconds. It is to be noted that the video title set time map table VTS_MAPT is optional, for example it will be empty in home recorded discs. Hence this table cannot be used for deriving further speed pointers. VTSM_C_ADT is a video tile set menu cell address table, in which the starting and ending address of each cell comprising the video title set menu and the like are described. VTSM_VOBU_ADMAP is a video title set menu video object unit address map, in which the starting addresses of menu video object units are described. VTS_C_ADT is a video title set cell address table, in which cell address information is described. When a program chain is selected in the playback apparatus, the order of playing back cells is set by that chain. In playback, NV_PCK included in the video object unit is referred to. NV_PCK has information for controlling display contents and display timing and information for data search. Thus, the retrieval and decoding of V_PCK are performed on the basis of information in the NV_PCK table. In addition, another pack is retrieved and decoded, in which case A_PCK and SP_PCK in a language specified by the producer or user are retrieved.

FIG. 9 shows the contents of the video title set program chain information table (VTS_PGCIT). In this table are described video title set PGCI table information (VTS_PGCITI), search pointers (VTS_PGCI_SRP#1 to #n) for video title set program chain information, and specific program chain information (VTS_PGCI). In (VTS_PGCITI) are described the number of search pointers and the ending address of this table. In (VTS_PGCI_SRP#1 to #n) are described, as the category of the video tile set program chain, the number of titles in a video title set that becomes a target, whether the program chain ends with one block or continues into a chain in another block, etc. In addition, the starting address of the video title set program chain is described in terms of the relative address to the starting position of this table.

FIG. 10 describes the contents of program chain information (PGCI). The PGCI contains program chain general information (PGCI_GI), a program chain command table (PGC_CMDT), a program chain program map (PGC_PGMAP), cell playback information (C_PBI), and cell position information table (C_POSIT). In the PGCI_GI are described the number of programs and the number of cells for this program chain (this information is called PGC contents (PGC_CNT)). In addition, all the playback times that the program chain intends are shown (this information is called PGC playback time (PGC_PB_TM)). Moreover, a code of whether a program played back by this program chain allows user operation, for example, whether the switching of angles is possible, is described (this information is called PGC user operation control (PGC_UPR_CTL)). Furthermore, codes of whether audio streams can be switched and what type of audio stream (e.g. linear PCM, AC-3, MPEG or the like) can be switched into are also described (this information is called PFC audio stream control table (PGC_AST_CTLI). In addition, codes of whether subvideos can be switched and what type of subvideo (e.g., a different aspect ratio) can be switched into are described (this information is called PGC subvideo stream control table (PGC_SPST_CTLT). Moreover, in this PGCI_GI, the next program chain number and the previous program chain number are also described. Furthermore, whether the program intended by this program chain is intended for continuous playback, random playback, or shuffle playback is also described (this information called PGC navigation control (PGC_N-V_CTL). In addition, color specification is performed to indicate what colors subvideo is to be displayed in (this information is called PGC subvideo palette (PGC_SP_PLI)). Also, the starting address of the program chain command table (PGC_CMDT_SA), the starting address of the program chain program map (PGC_PGMAP_SA), the starting address of the cell playback information table (C_PBIT_SA) and the starting address of cell position information (C_POSI_SA) are described. In the program chain command table are described the pre-commands and post-commands of the program chain and cell commands. The pre-commands are ones to be processed prior to the execution of the program chain and the post-commands are ones to be processed after the execution of the program chain. The pre-commands and post-commands are used to define the video title, the reproduced state of audio, and the reproduced stream on the basis of commands or parameters decided in advance on the player side or the disk producer side. The cell commands are ones to be processed subsequent to the execution of playback processing of cells. In the starting address of the program chain program map (PGC_PGMAP), the structure of a program for which the program chain is intended is indicated and entry cell numbers of an existing program are described. In the cell playback information table (C_PBIT) is described information indicating the order of playing back cells for which the program chain is intended.

FIG. 11 shows cell playback information (C_PBIT) and its contents. The C_CAT is cell attribute information and indicates the mode of a cell block. The mode of a cell block indicates whether the cell is the first one or the last one. Also included are information as to whether seamless playback is to be performed, information as to whether the cell block is among interleaved blocks, and information about seamless angle switching. The information about seamless angle switching indicates that the angle switching can be made either seamlessly or non-seamlessly. C_PBTM indicates the cell playback time, C_FVOBU_SA the starting address of the first video object unit (VOBU) of the cell, C_ILVU_EA the ending address of the first interleaved unit (ILVU) of the cell, C_FVOBU_SA the starting address of the last video object unit (VOBU) of the cell, and C_FVOBU_EA the ending address of the last video object unit (VOBU) of the cell. The addresses are described in terms of logical block numbers relative to the first logical block of VOBS to which the cell belongs. By referring to the cell playback information, a determination can be made of whether the current playback state reaches the end of a cell. When the next cell is played back the next cell playback information in the cell playback information table is referred to determine the starting address of the first VOBU of the next cell (or interleaved unit).

FIG. 12 shows the contents of the cell position information table (C_PSIT). The cell position information includes the ID number of a video object (C_VOB_IDN) in which the cell is contained and the cell ID number (C_IDN) of the cell. As described above, the management information describes cell playback information, in which there is cell attribute information indicating whether interleaved units for multiple angles or the like have been recorded. When a multi-angle video or a multi-story video is recorded, the playback apparatus needs to switch from the angle being played back to the other or switch from the story being played back to the other according to user's operation. In this case, the playback apparatus responds to the user's operation on the basis of the following information. First, the structure of a pack will be described.

FIG. 13 shows the formats of one pack and one packet. One pack comprises a pack header and a packet. In the packet header are described a pack start code, a system clock reference (SCR), etc. The pack start code is one indicating the beginning of the pack, and the system clock reference (SCR) is information indicating to the entire playback apparatus the reference time in the playback elapsed time. One pack is 2048 bits long and defined and recorded as one logical block on an optical disk. One packet comprises a packet header and video data or audio data or subpicture data, or navigation data. Stuffing may be provided in the packet header. Padding may be provided in the data division of the packet.

FIG. 14 shows the NV_PCK (see FIG. 5). The NV_PCK includes a picture control information (PCI) packet basically adapted to control display pictures and a data search information (DSI) packet existing in the same video object. In each packet are described a pack header and a substream ID, followed by data. In each pack header is described a stream ID, indicating NV_PCK. The substream ID is used to distinguish between PCI and DSI. In each pack header are described a packet start code, a stream ID and the packet length, followed by data. The PCI packet is navigation data for changing display contents synchronously with the playback of video data in a video object unit (VOBU) to which the NV packet belongs. In the PCI packet are described PCI general information (PCI_GI) that is general information, non-seamless angle information (NSML_ANGLI), highlight information (HLI) and recording information (RECI) that is recorded information. In the PCI_GI is described PCI general information, which includes: the logical block number (NV_PCK_LBN) that is the address of the navigation pack, the video object unit category (VOBU_CAT) indicating the attribute of a video object unit (VOBU) managed by the PCI, the user operation control (VOBU_UPO_CTL) that is user operation inhibit information in the display period of the video object unit managed by the PCI, the video object unit display starting time (VOBU_S_PTM), and the video object unit display ending time (VOBU_E_PTM). The first picture specified by the VOBU_S_PTM is an I-picture in the MPEG standards. Further, video object unit sequence end presentation time (VOBU_SE_E_PTM) indicating the display time of the last video in the video object unit, the cell elapsed time (C_EITM) indicating the display elapsed time relative to the first video frame in a cell and so on are also described. The NSML_ANGL indicates the destination address when an angle change is made. That is, the video object unit includes pictures shot from different angles. The address of a VOBU is described to which a transition is made for the next playback when the display of pictures shot from a different angle from the current one is specified by the user. The HLI is information for specifying a specific rectangular area on the screen and changing the brightness of that area or the color of subvideo displayed therein. The information includes highlight general information (HL_GI), a button color information table (BTN_COLIT) used when the user makes a selection among buttons for color selection, and button information table (BTNIT) for select buttons. The RECI is information about video, audio and subpicture recorded in the video object unit, each item of information describing what data to be decoded is like. For example, a country code, a copyright owner code and the date of recording are included. The DSI packet is navigation data for making a search for a video object unit. In the DSI packet are described DSI general information (DSI_GI), seamless playback information (SML_PBI), seamless angle information (SML_AGLI), video object unit search information (VOBU_SRI), and sync information (SYNCI).

As shown in FIG. 15, in the DSI_GI is described the following information: a system clock reference indicating the reference time for starting decoding the NV_PCK (NV_PCK_SCR), the logical address of the NV_PCK (NV_PCK_LBN), the ending address of the video object unit to which the NV_PCK belongs (VOBU_EA), the ending address of the first reference picture (I-picture) to be decoded first (VOBU-1STREF-EA), the ending address of the second reference picture (P-picture) to be decoded first (VOBU-2NDREF_EA), the ending address of the third reference picture (B-picture) to be decoded first (VOBU_3RDREF_EA), the ID number of the VOB to which the DSI belongs (VOBU_VOB_IDN), the ID number of the cell to which the DSI belongs (VOBU_C_IDN), and the cell elapsed time indicating the elapsed time relative to the first video frame in the cell (C_E1TM).

As shown in FIG. 16, in the SML_PBI is described the following information: video object unit seamless category indicating whether the VOBU to which the DSI belongs is an interleaved unit (ILVU) or a pre-unit (PREU) that is the criterion for indicating the connection between video objects, the ending address of the interleaved unit (ILVU_EA), the starting address of the next interleaved unit (ILVU_SA), the size of the next interleaved unit (ILVU_SZ), the video display starting time in the video object (VOB) (VOB_V_S_PTM), the video display ending time in the video object (VOB) (VOB_V_E_PTM), the audio stopping time in the video object (VOB) (VOB_A_STP_PTM), and the audio gap length in the video object (VOB) (VOB_A_GAP_LEN). The pre-unit (PREU) is the last unit in a BOVU immediately before the interleaved unit. In the video object unit seamless, category (VOBU_SML_CAD) are further described a flag indicating whether or not the interleaved unit is one at the starting time and a flag indicating whether the interleaved unit is one at the ending time.

FIG. 17 shows the contents of the seamless angle information (SML_GLI). C1 to C9 indicate the number of angles. Even if a maximum of nine angles exists, the addresses and sizes of their destination interleaved units can be indicated. That is, the addresses and sizes (SML_ADL_Cn_DSTA) (n=1 to 9) of interleaved units that are destinations for the respective angles are described. When the user performs an operation of changing the angle while watching video, this operation information is referenced to, thereby allowing the playback apparatus to recognize the playback position of the next interleaved unit.

FIG. 18 shows VOBU search information (VOBU_SRI) which is referenced to at the time of special playback, etc. The information describes the starting addresses of VOBUs (0.5×n) seconds before and after the starting time of the current video object unit (VOBU). That is, the starting address of each of +1, +20, +60, +120 and +240 VOBUs as forward addresses (FWDIn) and a flag that a video pack is present in the unit are described according to the order of playback with the VOBU containing the DSI being referenced to. The starting address is described in terms of the number of logical sectors relative to the leading logical sector in the VOBU. The use of this information permits VOBUs the user wants to play back to be selected optionally.

The above-described management information is described for an optical disk. The system controller of the playback system makes a reference to the program chain information in the video manager to thereby acquire cell playback information. Hence the cell playback order is known from the Program Chain Information (PGCI). According to the invention the rendering device as shown in FIG. 2 comprises speed means for reproducing the real time information at a speed different from the real time speed, and calculation means for calculating speed pointers in addition to local speed pointers available within the real time information data stream.

FIG. 19 shows the calculation of average time per unit. In the playback system the cell playback order is known at the START node 200. In a first step 201 READ_CELL_INFO a cell playback information table (C-PBIT, see FIG. 11) is retrieved. From this table addresses of the first unit (C_FVOBU_SA) and the last unit (C_FVOBU_SA) within that cell and its playback time are read. In a second step 202 READ_ADR_MAP the unit address map (VTS_VOBU_ADMAP, see FIG. 8) is retrieved. This map includes the addresses of the sequence of units constituting the video program as consecutively stored on the record carrier. In a third step 203 CALC_NUM the number of units within the cell is calculated. To this end the position of the addresses of said first and last unit in the unit address map is determined, e.g. by a lookup procedure of the addresses within the address map. From the position in the map the number of intermediate units NIU is easily determined, e.g. if an entry of one unit in the map requires n bytes, the number NIU equals the difference between said last and first position divided by n. In a fourth step 204 CALC_AT the average time per unit ATU is calculated as follows. The playing time of the cell (C_PBTM) is known from the cell playback information table (C-PBIT). The value for ATU follows from dividing the cell playback time C_PBTM by the number of units NIU. Finally one or more speed pointers are determined for specific required time jumps by calculating the amount of units to be jumped. The amount of units is the required time jump divided by the average playing time ATU. Then the target unit is known and its address is taken from the address map VTS_VOBU_ADMAP. At step 205 JUMP a jump to the target unit is made, and the target unit is displayed. Further it is decided if the speed of reproduction is does require further speed pointers or if the speed of reproduction is within the range that can be handled with the available speed pointers. If so, then in step 207 PLAYBACK the required playback mode is entered, e.g. after a time search procedure.

In a second embodiment of the calculation unit the speed pointers are calculated as follows. In step 204 CALC_AT the average time per unit ATU is calculated by determining the remaining playing time of the cell by reading the cell elapsed playing time (C_ELTM, see FIG. 15) from the unit currently rendered and subtracting the elapsed time from the cell playing time. Also the remaining number of units NIU is determined by locating the start address of the current unit in the address map VTS_VOBU_ADMAP. Using the actual remaining time gives a more accurate estimate of the average playing time ATU.

In a third embodiment of the calculation unit the speed pointers are calculated as follows. At the step 205 JUMP after the jump has been made and the target unit is being rendered, it is detected that the speed mode again requires speed pointers. Now the step 204 is executed again as described in the second embodiment above. In an embodiment of the calculation unit speed error compensation is calculated as follows. After a jump in step 205 based on a calculated speed pointer, in a step 206 ERROR_COMP the actual playing time is derived from the cell elapsed playing time (C_ELTM). It is noted that an error in speed may occur due to the difference of the actual playing time of the units and the estimated average playing time. The required playing time at that jump location is known from the speed that has been selected. The error in time T_ERR between the required and the actual playing time is detected, e.g. calculated by subtracting. The speed error T_ERR can be compensated in several ways, for example by displaying the video fragment represented by the target unit for a longer or shorter time in dependence upon the error. Also the next number of unit to be jumped can be made dependent upon the speed error T_ERR for compensating the error, e.g. by effectively setting the speed somewhat higher, i.e. resulting in a higher number of units to be jumped in the next jump.

Although the invention has been explained by embodiments using the DVD-video format, it may be applied for any format for real-time data requiring non-causal control data to be written multiplexed within the real-time data itself. Also for the information carrier an optical disc has been described, but other media, such as a magnetic disc or tape, may be used. It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' may be represented by the same item of hardware. Further, the scope of the invention is not limited to the embodiments, and the invention lies in each and every novel feature or combination of features described above.

The invention claimed is:

1. Device for rendering real time information from a record carrier, which device comprises read means (22, 27, 28) for retrieving the real time information and playback parameters related thereto from a track on the record carrier, and speed means (31) for rendering the real time information at a speed different from the real time speed based on speed pointers, which real time information is subdivided into units (VOBU), a number of consecutive units constituting a cell and local playback parameters being included in the units, which local playback parameters comprise speed pointers (VOBU$_{13}$SRI) to units located at a forward and/or backward distance relative to the unit in which the pointers are included, characterized in that the speed means (31) comprise calculation means (32) for calculating at least one further speed pointer based on estimating the playback time of the units by retrieving cell playback information (C-PBIT) that includes the addresses of the first unit and the last unit within the cell and a cell playback time, retrieving a unit address map (VTS-VOBU-ADMAP) that includes the addresses of a consecutive sequence of units, determining a number of units within the cell by determining a position of the addresses of said first and last unit in the unit address map, and dividing the cell playback time by the number of units.

2. Device as claimed in claim 1, wherein the speed means are arranged for using the speed pointers included in the local playback parameters for jumping to distances in time up to a predefined value and for using the further speed pointer for jumping a larger distance in time.

3. Device as claimed in claim 1, wherein the speed means are arranged for detecting for which maximum local jump distance a local speed pointer is available and using the local speed pointers for jumping distances up to the maximum local jump distance.

4. Device as claimed in claim 1, wherein the speed means are arranged for detecting a cell boundary and for using the further speed pointer for jumping a distance in time across said cell boundary.

5. Device as claimed in claim 1, wherein the calculation means are arranged for adjusting said estimated playback time of the units by retrieving a current cell time (C$_{13}$ELTM) from the unit being currently rendered, calculating the remaining cell playback time from the cell playback time and the current cell time, and calculating a remaining number of units within the cell and dividing the remaining cell playback time by the remaining number of units.

6. Device as claimed in claim 1, wherein the speed means are arranged for detecting a speed error by comparing a current cell time (C$_{13}$ELTM) from the unit being retrieved after a jump and a target time based on a required speed, and for compensating the speed error.

7. Device as claimed in claim 6, wherein the speed means are arranged for adjusting the number of units for a next jump or the display time of a fragment of real time information for compensating the speed error.

8. Method of rendering real time information, which method comprises controlling the speed of rendering the real time information to a speed different from the real time speed based on speed pointers, which real time information comprises playback parameters related thereto and is subdivided into units (VOBU), a number of consecutive units constituting a cell and local playback parameters being included in the units, which local playback parameters comprise speed pointers (VOBU_SRI) to units located at a forward and/or backward distance relative to the unit in which the pointers are included, characterized in that the method comprises calculating at least one further speed pointer based on estimating the playback time of the units by retrieving cell playback information (C-PBIT) that includes the addresses of the first unit and the last unit within the cell and a cell playback time, retrieving a unit address map (VTS-VOBU-ADMAP) that includes the addresses of a consecutive sequence of units, determining a number of units within the cell by determining a position of the addresses of said first and last unit in the unit address map, and dividing the cell playback time by the number of units.

* * * * *